Dec. 6, 1955 C. R. ZIMMER 2,725,831
METHOD AND MEANS FOR COATING EDIBLE CENTERS OR CORES
Filed June 20, 1951
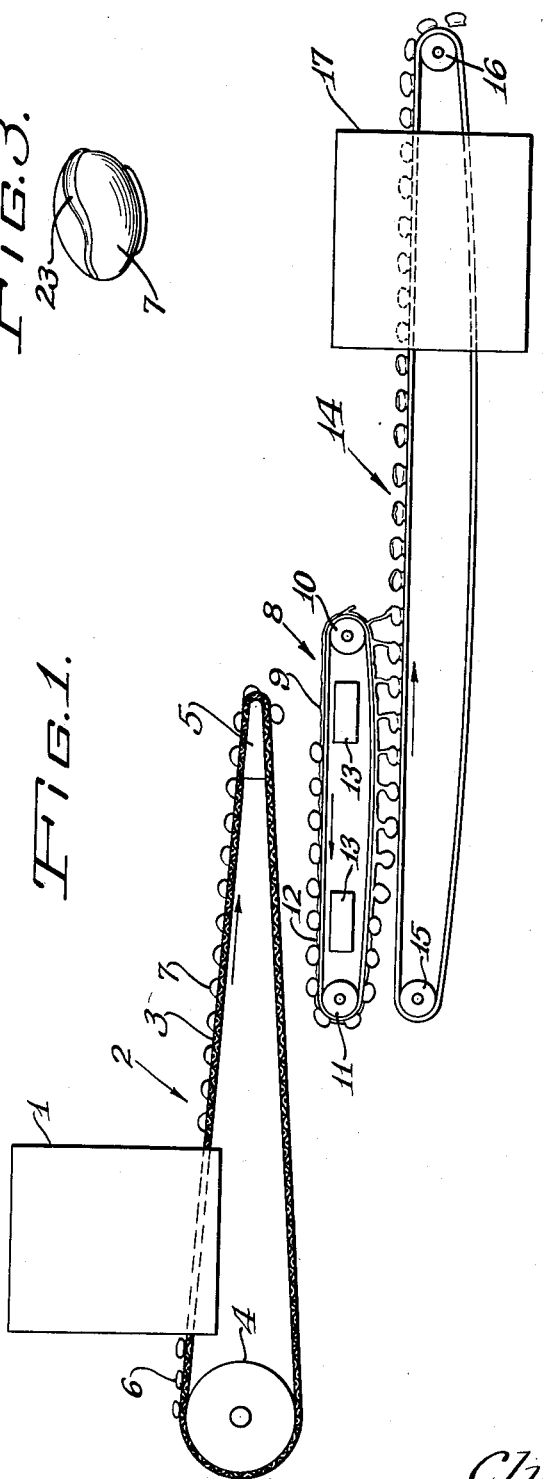
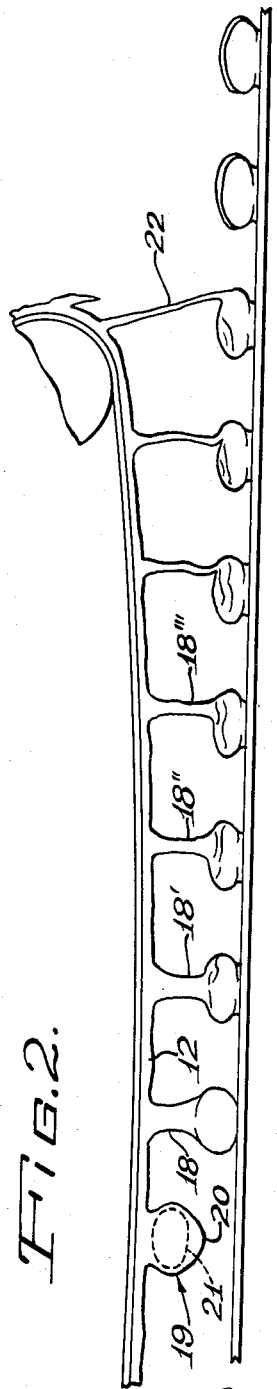
Inventor:
Clyde R. Zimmer
By Gary, Desmond & Parker Attys.

United States Patent Office 2,725,831
Patented Dec. 6, 1955

2,725,831

METHOD AND MEANS FOR COATING EDIBLE CENTERS OR CORES

Clyde R. Zimmer, Chicago, Ill., assignor to E. I. Brach & Sons, Chicago, Ill., a corporation of Illinois Application June 20, 1951, Serial No. 232,612

8 Claims. (Cl. 107—54)

This invention relates to improvements in a method and means for depositing a confectionery coating upon edible centers, and refers particularly to a method and means for so coating said centers as to apply a heavier coating in a single pass, provide a more attractive coating and accomplish the coating operation in a shorter period of time than has heretofore been possible.

In coating edible centers, such as nuts, raisins, fruits, candies and the like with a confectionery coating such as chocolate or the like, it is desirable that as heavy a coating be deposited upon the center as possible in a single pass of the centers through the coating operation, and that said pass be made as rapidly as possible. In addition, it is desirable that the finished product be attractive and inviting in appearance.

The present invention contemplates a unique process of coating said centers with a confectionery, the process broadly contemplating passing the centers upon a conveyor through a conventional enrober wherein an excess of confectionery in a molten, relatively viscous, semifluid condition is deposited upon the centers; carrying the enrobed or coated centers forwardly and transferring them by gravity to a lower endless conveyor whose upper pass moves in the same direction and at substantially the same speed as the lower pass of the first-mentioned conveyor; subsequently, transferring the coated centers from the second conveyor by gravity to a lower third conveyor whose upper pass moves in the same direction as the lower pass of the second conveyor. The second conveyor has an imperforate surface and confectionery in a plastic viscous condition accumulates thereon in a relatively thin layer and as a consequence, the coated centers in passing from the second conveyor to the third conveyor adhere to the surface of the second conveyor and are carried forwardly upon the lower pass of the second conveyor for a predetermined distance, slowly leaving the underpass of the second conveyor as a viscous suspended mass which eventually alights upon the upper pass of the third conveyor. The upper pass of the third conveyor moves parallel, and relatively closely adjacent, to the lower pass of the second conveyor. As the viscous mass leaves the underpass of the second conveyor the viscosity of the confectionery is such that an adherent "string" or "tail" connects the coated center to the surface of the underpass, the speed of the conveyors being such and the spacing of the conveyors being such that said string or tail connection persists to substantially the end of the second conveyor whereat it breaks and the coated center moves forwardly on the third conveyor to a cooling chamber for subsequent packaging.

One of the important features of the invention resides in a process wherein the string or tail, hereinbefore mentioned, persists for a predetermined period of time whereby additional confection from the lower pass tends to feed downward by means of the string or tail to the top of the coated center as long as the string persists.

Another feature of the invention resides in the fact that the third conveyor may be driven at a speed that is equal to, slightly greater or slightly less than the speed of the second conveyor whereby the string or tail may drape itself over the length of the coated center carried by the third conveyor thus forming a most attractive configuration upon the upper surface of the coated center resembling a hand-manipulated decoration.

A further important feature of the invention resides in the fact that the coated center in dropping from the underpass of the second conveyor to the upper pass of the third conveyor does so very slowly and, hence, confectionery tends to accumulate at the bottom of the center in the form of a drop tending to stretch the viscous confectionery about the lateral walls of the center and accentuating the shape of the center. In this fashion, if such centers as nuts are coated, the characteristic shape of the nut is suggested in the final product, as opposed to the formation of a shapeless "gob" of confectionery in which the center is embedded.

Another important feature of the invention resides in that characteristic of the process wherein the coated centers, in dropping from conveyor to conveyor tend to individualize themselves, and clusters of two or more coated centers are most infrequent.

Other objects and advantages of the present invention will be apparent from the accompanying drawing and following detailed description.

In the drawings,

Fig. 1 is a diagrammatic side elevational view of apparatus suitable for carrying out my invention.

Fig. 2 is an enlarged view of a portion of the device shown in Fig. 1 particularly illustrating a critical step in the process.

Fig. 3 is a perspective view of the finished coated confection.

My invention will be described in conjunction with the making of chocolate coated nuts since the invention lends itself ideally to the making of this product. However, the making of chocolate coated nuts is merely set forth for purposes of example since other types of cores or centers, such as, raisins, fruits, candies or the like may be handled and coated with equal facility.

Referring in detail to the drawing, 1 indicates diagrammatically a conventional enrober, that is, a well known device for initially coating, enshrouding, or as the name implies, enrobing cores or centers with a molten, relatively viscous, semi-fluid confectionery coating, such, for instance, as chocolate. In conjunction with the enrober an endless conveyor 2 is employed, the conveyor comprising essentially an endless wire mesh belt or screen 3. At the entrance end of the enrober, the screen is trained around a pulley 4 which may be driven by any suitable means (not shown) and at the forward end of the conveyor the screen reverses its movement over a nose bar 5.

Cores or centers 6, such as nuts, for instance, may be deposited upon the upper pass of the conveyor screen 3 and may be carried through the enrober thereby. In the enrober, molten confection such as viscous chocolate or the like is literally poured upon the cores or centers completely covering them. An excess of chocolate is poured upon the nuts, a portion of which passes through the meshes of the screen and is caught and recycled. However, as the coated centers 7 emerge from the enrober they carry an excess of chocolate and by adherence the meshes of the screen also carry chocolate.

As the screen passes over the nose bar 5, because of the excess of confectionery carried by the nuts and by the screen meshes, the coated nuts 7 tend to ride around the nose bar and adhere to the screen for a portion of its reverse travel. However, by virtue of the surface of the screen, that is, being reticulated and non-continuous, the adhering nuts 7 soon fall from the screen. In addition, some of the chocolate carried by the meshes also drips from the reversely moving screen.

Beneath the forward portion of the screen conveyor 2, an endless conveyor 8 is positioned, said conveyor comprising an imperforate, relatively smooth surfaced belt 9 which is trained around pulleys 10 and 11 at the extremities of its travel. The belt 9 is also driven by suitable means (not shown) and travels at a peripheral speed substantially equal to the peripheral speed of the screen conveyor 3. The upper pass of the belt 9 moves substantially parallel to and in generally the same direction as the lower pass of the screen 3.

As an important feature of my invention, the excess chocolate carried by the coated nuts 7 and the drippings from the meshes of the screen 3 form a coating of chocolate, designated 12, on the surface of the belt 9. Shortly after initial commencement of operations, this coating forms upon the belt 9 and thereafter during normal continued operation a relatively thin coating is always present upon the belt surface. The importance of this aspect of my invention will be more apparent hereinafter. The coated cores, centers or nuts 7 which fall from the screen 3 alight upon the upper pass of the conveyor belt 9 and are thereby carried rearwardly. When the belt 9 passes over the rear pulley 11, the coated nuts 7 adhere to the belt for an appreciable length of its lower pass. A number of factors contribute to this phenomena including the character of the surface of the belt, being smooth and imperforate; the fact that a layer 12 of confectionery has formed upon the belt, functioning somewhat as an adhesive; and also due to the fact that the nuts themselves are coated with the viscous, adhesive confection. In order to maintain the confection constituting the layer 12 and the coating of the nuts at a desired degree of adhesiveness and viscosity, heaters 13 are disposed adjacent the path of travel of the belt, preferably between the passes thereof, whereby the chocolate is heated and maintained at the desired degree of fluidity and prevented from chilling and setting.

A conveyor 14 is positioned beneath the conveyor 8, conveyor 14 comprising an imperforate endless belt trained at its extremities of travel around pulleys 15 and 16. When the coated centers or nuts 7 drop from conveyor 8, they alight upon the upper pass of conveyor 14 and are carried thereby through a conventional cooler 17 wherein the temperature of the coating is reduced and the coating is chilled and set. Upon emerging from the cooler 17, the coated cores or nuts are delivered for packaging.

As a feature of my invention, however, the coated nuts 7 carried on the upper pass of the conveyor belt 9 are eventually carried around the pulley 11. Due to the fact that the confectionery or chocolate comprising the layer 12 and the coating upon the nuts is maintained in a viscous, adhesive, semi-fluid condition at this stage of the process, the coated nuts 7 tend to adhere to the surface of the belt 9 during a portion of its lower pass. As the nuts are carried away from the pulley 11 on the lower side of the belt 9 they very slowly leave the belt surface in the fashion of a slowly descending globule or "gob," being connected to said belt surface by an ever lengthening "string" or "tail," as indicated at 18 in Fig. 2, the string or tail 18 comprising the viscous adhesive, semi-fluid confectionery.

One phenomena which occurs after the initial inversion of the surface 9, is the formation of a globule or drop, indicated generally at 19 in Fig. 2. The lowermost portion of this globule assumes a more or less pointed contour, as indicated at 20 formed by an accumulation by gravity of chocolate. The remaining portion of the globule then appears to delineate or define the shape of the core or center, indicated at 21 in Fig. 2, it appearing that the coating of cholocate upon the lateral walls of the core becomes attenuated. In this fashion, when the coated nut alights upon the upper pass of the conveyor 14 it is characterized by the general shape of the core or nut center, as opposed to being a shapeless mass. This fact lends attractiveness to the finished confection.

As an important feature of my invention, the upper pass of belt 14 may be driven at a peripheral speed substantially equal to, slightly faster or slightly slower than the peripheral speed of the lower pass of belt 9. For a purpose to be hereinafter described, I prefer, however, to drive belt 14 slightly slower than belt 9.

After the coated nut alights upon belt 14, and being connected to the lower pass of belt 9 by the string or tail 18, both belts 9 and 14 moving at approximately the same speed, the string 18 moves forwardly with the movement of the coated core to which it is secured, and this adherent relationship between string and coated core persists for a predetermined distance of travel of the belts. As the belts move forwardly, chocolate feeds downwardly along the connecting string from the under surface of belt 9 to the top of the connected coated core tending to add additional coating to the core. Also, as the belts move forwardly, the string progressively becomes more attenuated, as indicated at 18', 18'', 18''' and so on. At the end of the travel of belt 9, the string eventually breaks, as shown at 22 in Fig. 2, a portion of the string draping itself upon the top of the coated core and a portion of the string adhering to the belt 9 thereby tending to replenish the layer 12.

If, as preferred, the belt 14 is moved slightly slower than the belt 9, it will be noted that the string moves across the upper surface of the coated core as the coated core moves forwardly relative to the upper anchorage of the string upon the surface 9. In this fashion a rib of decreasing thickness drapes itself across the top of the coated core, as indicated at 23 in Fig. 3. The draped string or rib 23 need not be uniform in direction as it forms upon the core, since its formation and shape are dependent upon variable factors including the difference in speed of belts 9 and 14. I have found that the draped rib 23 may be made to assume a variety of configurations, both simple and intricate, and may simulate the appearance of a hand-manipulated decorative rib frequently seen upon coated confections.

If desired, the lower pass of belt 9 and the upper pass of belt 14 may be maintained parallel, but I prefer to take advantage of the inherent sag in the belt 9 above belt 14 whereby the central portion of the lower pass of belt 9 is closer to the belt 14 than at its extremity of forward travel. By this arrangement the attenuation of the string 18 can be made more gradual.

As an example of my method and machine for carrying out the method, peanuts may be coated with a chocolate confection. The upper pass of belt 9, at the approximate point where the coated nuts 7 drop from the screen 3, was about three inches below the screen. The distance between pulleys 10 and 11 was about 24 inches and the central portion of the lower pass of belt 9 was about 1½ inches above the upper pass of belt 14 and belt 9, at the forward extremity of its travel was about 2¼ inches. The screen 3 and belt 9 were driven at about 14.25 feet per minute and belt 14 was driven at about 14 feet per minute. It was found that the coated nuts 7 adhered to the lower pass of belt 9 for about 8 to 12 inches of its travel. The viscosity of the chocolate confection upon belt 9 and upon the nuts carried thereon was about 350° to 400° M. M. as measured upon a MacMichael viscosimeter. In measuring the viscosity of the chlocoate on the MacMichael viscosimeter, the chlocoate temperature is maintained at 100° F.; a 1 centimeter bob is employed; 4 centimeters immersion; a No. 27 Standard M. M. test wire is employed; and rotation at 20 revolutions per minute is used. The actual reading in degrees times 4 equals the degrees M. M. viscosity. The temperature of the chocolate confectionery on belt 9 and during passage to belt 14 was maintained at about 88° F. ranging between 84° and 91° F.

Of course, the above example is not to be construed as a limitation of my process, being merely set forth for purposes of illustration.

As has been hereinbefore described, the belt 9 may be driven at a speed equal to, faster or slower than, the speed of belt 14. If a differential of speed of the belts is employed it is desirable that the slower moving belt move not less than about 95 per cent of the speed of the faster moving belt, preferably, not less than about 97 or 98 per cent of the speed of the faster moving belt. If the speeds of the belts are maintained equal, the rib 23 tends to assume the form, roughly, of a spiral helix upon the top of the coated center 7. If one belt is moved materially faster than the other, the bead tends to assume the direction of a substantially straight line across the top of the coated center. At preferred differential speeds, the rib 23 assumes a variety of curvilinear forms which are nonuniform as to different coated centers, being suggestive of the product of the well known hand manipulative operation in forming such decorative ribs.

As a further feature of my invention the operation hereinbefore described is signally free from the formation of clusters, that is, where two or more cores adhere and form a unitary confectionery element. In processes heretofore proposed for the coating of individual cores, as high as 35 per cent of the finished products were clusters. In my process clusters average about ½ of one per cent. In addition, overall production is increased in my process by about 35 per cent over processes heretofore proposed.

I claim as my invention:

1. In a process of coating edible centers with a confectionery wherein an excess quantity of relatively viscous confectionery is deposited upon edible centers to coat the same, the improvement which comprises depositing said centers upon a moving surface, suspending said centers from said surface by the adherence of said viscous confectionery, lowering said suspended centers from said surface by gravity and depositing the same upon a second surface moving parallel to the movement of said first-mentioned surface while maintaining viscous confectionery string connections between said suspending surface and said deposited centers for a predetermined distance of travel of said suspending surface and said deposited centers carried by said second surface to feed confectionery from said string connections onto the top of said centers, and subsequently breaking said string connections and carrying the coated centers forwardly.

2. In a process of coating edible centers with a confectionery wherein an excess quantity of relatively viscous confectionery is deposited upon edible centers to coat the same, the improvement which comprises depositing said centers upon a moving surface, inverting said surface and suspending said centers from said surface by the adherence of said viscous confectionery, lowering said suspended centers from said inverted surface by gravity and depositing the same upon a second surface moving parallel to the movement of said inverted surface while maintaining viscous confectionery string connections between said inverted suspending surface and said deposited centers for a predetermined distance of travel of said inverted surface and said deposited centers carried by said second surface to feed confectionery from said string connections upon the top of said centers, and subsequently breaking said string connections and carrying the coated centers forwardly.

3. In a process of coating edible centers with a confectionery wherein an excess quantity of relatively viscous confectionery is deposited upon edible centers to coat the same, the improvement which comprises depositing said centers upon a moving surface, maintaining a layer of viscous confectionery upon said surface, suspending said centers from said surface by the adherence of said viscous confectionery, lowering said suspended centers from said surface by gravity and depositing the same upon a second surface moving parallel to the movement of said first-mentioned surface while maintaining a viscous confectionery string connection between said suspending surface and each of said deposited centers for a predetermined distance of travel of said suspending surface and said deposited centers carried by said second surface to feed confectionery from said string connections as an elongated ridge upon the top of each of said centers, and subsequently breaking said string connections and carrying the coated center forwardly.

4. In a process of coating an edible center with a confectionery wherein an excess quantity of relatively viscous confectionery is deposited upon an edible center to coat the same, the improvement which comprises depositing said center upon a moving surface, maintaining a quantity of viscous confectionery upon said surface, heating said confectionery upon said surface to maintain the same in viscous plastic condition, inverting said surface and suspending said center from said inverted surface by the adherence of said viscous confectionery, lowering said suspended center from said inverted surface by gravity and depositing the same upon a second surface moving parallel to the movement of said first-mentioned inverted surface while maintaining a viscous confectionery string connection between said inverted suspending surface and said deposited center carried by said second surface for a predetermined distance of travel of said deposited center and said inverted surface to feed confectionery from said string connection upon the top of said center, and subsequently breaking said string connection and carrying the coated center forwardly.

5. In a process of coating edible centers with a confectionery wherein a quantity of relatively viscous confectionery in heated plastic condition is deposited upon edible centers to coat the same, the improvement which comprises depositing said centers upon a moving surface, inverting said surface, suspending said centers from said inverted surface by the adherence of said viscous confectionery for a predetermined distance of movement of said surface, lowering said suspended centers relatively slowly from said inverted surface by gravity and depositing the same upon a second surface moving parallel to the movement of said first-mentioned inverted surface while maintaining a viscous confectionery string connection between said suspending surface and each of said deposited centers for a predetermined distance of travel of said inverted surface and said deposited centers carried upon said second surface to feed confectionery from said string connections upon the top of said centers, moving said second surface at a different speed than the said inverted surface to drape a portion of each of said string connections over a portion of the top of each center, and subsequently breaking said string connections and carrying the coated centers forwardly.

6. In a continuous process of coating edible centers with a confectionery wherein confectionery in relatively viscous condition is continuously applied to a plurality of edible centers to coat the same, the improvement which comprises depositing said centers upon a moving endless surface, suspending said centers continuously by the adherence of said viscous confectionery upon said surface, continuously lowering said suspended centers from said surface by gravity and depositing the same upon a second moving endless surface moving parallel to the movement of said first-mentioned surface while maintaining a viscous confectionery string connection between said suspending surface and said deposited centers for a predetermined distance of travel of said suspending surface and said deposited centers carried upon said second moving surface to feed confectionery from said string connections upon said centers.

7. In an apparatus for coating edible centers with a confectionery wherein confectionery in molten, adhesive condition is deposited upon edible centers, the combination of a moving endless imperforate conveyor, means for disposing said coated centers upon the upper pass of said conveyor, means disposed adjacent said conveyor for maintaining the confectionery coating upon the center carried by said conveyor in molten, adhesive condition, a second moving endless conveyor positioned beneath said first-mentioned conveyor for receiving by gravity on its upper pass said coated centers, the upper pass of said second conveyor moving substantially parallel to and in substantially the same direction as the lower pass of the first-mentioned conveyor, said conveyors being arranged and operable to provide a string connection of confectionery between said first-mentioned conveyor and each of the coated centers carried by said second conveyor and to enable said string connections to persist for a predetermined distance of travel of said second conveyor after said centers are received on said second pass.

8. In an apparatus for coating edible centers with a confectionery wherein confectionery in molten, adhesive condition is deposited upon edible centers, the combination of a moving endless conveyor having an imperforate relatively smooth surface, means for disposing said coated centers upon the upper pass of said conveyor, means for inverting said conveyor to form a lower pass from which said centers gradually fall while said lower pass moves a predetermined distance, a second endless conveyor upon which said centers fall, said second conveyor having an upper pass disposed beneath the lower pass of said first-mentioned conveyor and moving in substantially the same direction and substantially parallel to the movement of said lower pass, said conveyors being arranged and operable to provide a string connection of confectionery between said first-mentioned conveyor and each of the coated centers carried by said second conveyor and to enable said string connections to persist for a predetermined distance of travel of said second conveyor after said centers are received on said second pass.

References Cited in the file of this patent

UNITED STATES PATENTS

| | | |
|---|---|---|
| 859,125 | Short | July 2, 1907 |
| 990,175 | Walker | Apr. 18, 1911 |
| 1,160,792 | Van Houten | Nov. 16, 1915 |
| 1,664,826 | Messer | Apr. 3, 1928 |
| 1,813,655 | Bausman | July 7, 1931 |
| 2,101,240 | Cloud | Dec. 7, 1937 |
| 2,320,297 | Perkins | May 25, 1943 |